US007969039B2

(12) United States Patent
Mimatsu et al.

(10) Patent No.: US 7,969,039 B2
(45) Date of Patent: Jun. 28, 2011

(54) METHOD OF CONTROLLING FUEL CELL VEHICLE AND METHOD OF CONTROLLING DC/DC CONVERTER APPARATUS

(75) Inventors: Naoyuki Mimatsu, Utsunomiya (JP); Yasushi Kojima, Utsunomiya (JP); Seigo Murashige, Utsunomiya (JP); Yutaka Asano, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 50 days.

(21) Appl. No.: 12/354,544

(22) Filed: Jan. 15, 2009

(65) Prior Publication Data
US 2009/0243386 A1    Oct. 1, 2009

(30) Foreign Application Priority Data

Mar. 25, 2008   (JP) .................................. 2008-077259

(51) Int. Cl.
*B60L 1/00*      (2006.01)
*B60L 3/00*      (2006.01)
*H02G 3/00*      (2006.01)

(52) U.S. Cl. .... 307/9.1; 307/10.1; 180/65.1; 180/65.21; 180/65.29; 180/65.31; 318/139; 318/400.2; 318/400.09; 318/400.26; 318/400.27; 318/400.28; 318/400.29; 318/800; 318/801; 318/802; 318/803; 318/804; 318/805; 318/806; 318/807; 318/808; 318/809; 318/810; 318/811; 320/101; 323/225; 323/272; 323/282; 323/299; 323/351; 363/17; 363/20; 701/22; 903/907

(58) Field of Classification Search .................. None
See application file for complete search history.

(56) References Cited

U.S. PATENT DOCUMENTS

| 5,710,699 | A | 1/1998 | King et al. | |
|---|---|---|---|---|
| 6,043,634 | A | 3/2000 | Nguyen et al. | |
| 6,628,106 | B1 * | 9/2003 | Batarseh et al. | 323/222 |
| 7,088,065 | B2 * | 8/2006 | Ishikawa et al. | 318/376 |
| 7,408,794 | B2 * | 8/2008 | Su | 363/98 |
| 7,646,160 | B2 * | 1/2010 | Chen et al. | 318/490 |
| 7,768,800 | B2 * | 8/2010 | Mazumder et al. | 363/17 |
| 2004/0100149 | A1 * | 5/2004 | Lai | 307/82 |
| 2005/0212497 | A1 | 9/2005 | Cha | |
| 2006/0012340 | A1 * | 1/2006 | Saeki et al. | 320/132 |

(Continued)

FOREIGN PATENT DOCUMENTS

EP          0825059 A2    2/1998

(Continued)

OTHER PUBLICATIONS

Japanese Office Action for Application No. 2008-077259, dated Jan. 19, 2010.

(Continued)

*Primary Examiner* — Jared J Fureman
*Assistant Examiner* — Justen Fauth
(74) *Attorney, Agent, or Firm* — Nelson Mullins Riley & Scarborough LLP; Anthony A. Laurentano

(57) ABSTRACT

A controller is capable of executing direct couple control that directly couples a first power device and a second power device without causing a DC/DC converter to convert voltage. During the direct couple control, a drive signal that causes no voltage conversion is intermittently output to at least one of a plurality of switching devices.

17 Claims, 16 Drawing Sheets

U.S. PATENT DOCUMENTS

2006/0152085 A1   7/2006   Flett et al.
2007/0029986 A1*  2/2007   Nakamura et al. ............ 323/318
2007/0216225 A1*  9/2007   Fernandez et al. ............ 307/9.1
2007/0247003 A1* 10/2007   Elder et al. .................. 307/10.1

FOREIGN PATENT DOCUMENTS

| EP | 0825059 A3 | 2/1998 |
|---|---|---|
| EP | 1662641 A2 | 5/2006 |
| JP | 2004-357388 | 12/2004 |
| JP | 2006-296112 | 10/2006 |
| JP | 2007-159315 | 6/2007 |
| WO | 2006/044934 A2 | 4/2006 |
| WO | WO-2007/066676 A1 | 6/2007 |

OTHER PUBLICATIONS

European Search Report for Application No. 09000457.3, dated Mar. 18, 2009.

European Office Action for Application No. 09000457.3, dated Nov. 18, 2010.

\* cited by examiner

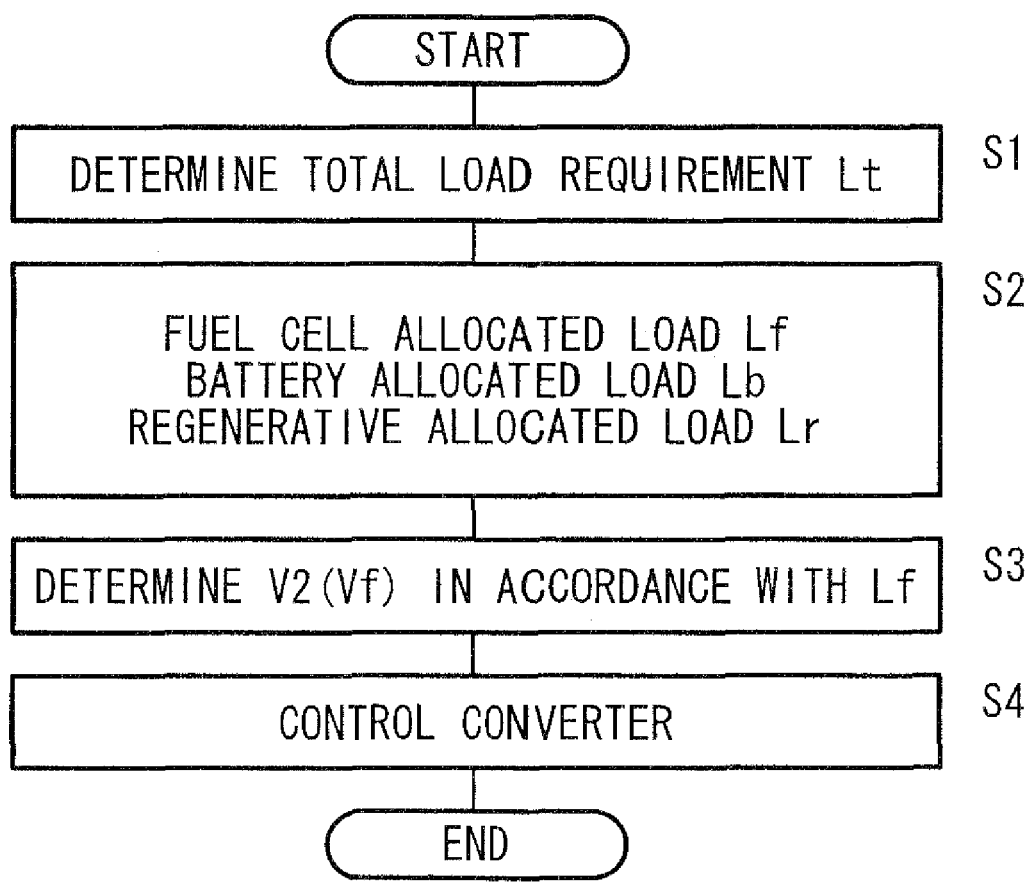

METHOD OF CONTROLLING FUEL CELL VEHICLE AND METHOD OF CONTROLLING DC/DC CONVERTER APPARATUS

BACKGROUND OF THE INVENTION

1. Field of the Invention

The present invention relates to a method of controlling a fuel cell vehicle and a method of a DC/DC converter apparatus, the fuel cell vehicle and the DC/DC converter apparatus including a DC/DC converter having a plurality of switching devices connected in parallel between two electric power devices (e.g. a fuel cell and a power storage device), and a controller for controlling voltage conversion performed by the DC/DC converter. More particularly, the present invention relates to a method of controlling a fuel cell vehicle and a method of controlling a DC/DC converter apparatus, in which the controller can execute direct couple control that directly couples the two electric power devices without voltage conversion being performed by the DC/DC converter.

2. Description of the Related Art

There has been known a DC/DC converter apparatus which performs voltage-increasing and voltage-decreasing processes using a plurality of switching devices (Japanese Laid-Open Patent Publication No. 2004-357388). The DC/DC converter apparatus disclosed in Japanese Laid-Open Patent Publication No. 2004-357388 includes a plurality of phase arms. Each phase arm is a combination of one upper switching device and one lower switching device, and is operable to perform both voltage-increasing and voltage-decreasing processes. The phase arms are operated in such a manner that their operation cycles are phase-shifted relative to one another to perform the voltage-increasing and voltage-decreasing processes (see the abstract of Japanese Laid-Open Patent Publication No. 2004-357388).

U.S. Patent Application Publication No. 2006/0012340 A1 discloses a technique for reducing electric power loss caused by operating a switching device when a fuel cell and a power storage device are directly coupled via a DC/DC converter. In U.S. Patent Application Publication, No. 2006/0012340 A1, the DC/DC converter apparatus is incorporated in a fuel cell vehicle.

As described above, techniques for increasing/decreasing voltage using a plurality of switching devices, and for directly coupling a fuel cell and a power storage device are known. However, a configuration which is capable of directly coupling a fuel cell with a power storage device using a DC/DC converter apparatus having a plurality of switching devices is not yet known, and hence, a suitable method for controlling such a configuration has not yet been studied.

SUMMARY OF THE INVENTION

The present invention has been made in view of the above-mentioned issue, and the object of the present invention is to provide a method of controlling a fuel cell vehicle that can directly couple a fuel cell and a power storage device in a suitable manner.

Another object of the present invention is to provide a method of controlling a DC/DC converter apparatus including a plurality of switching devices, and suitable for directly coupling two electric power devices.

In a method of controlling a fuel cell vehicle according to the present invention, the fuel cell vehicle includes a DC/DC converter having a plurality of switching devices, the switching devices arranged in parallel in an electrical circuit that forms a branch between a fuel cell and a driving motor and connects to a power storage device, and a controller for outputting drive signals to the switching devices and controlling voltage conversion of the DC/DC converter. The method comprises the steps of executing, by the controller, direct couple control in which the fuel cell or the driving motor is directly coupled with the power storage device without causing the DC/DC converter to convert voltage, and during the direct couple control, intermittently outputting a drive signal that causes no voltage conversion, to at least one of the switching devices.

According to the present invention, the drive signal (of 100% duty ratio, for example) that causes no voltage conversion can be intermittently outputted to at least one of the plurality of switching devices. During direct couple control, no current flows through the switching device to which drive signal causing no voltage conversion is not inputted. Hence, compared to the case that such drive signals are continuously inputted to all of the switching devices, and thus, heat generation in the switching device to which such a drive signal is not inputted can be reduced. Generally, the switching devices have different on-resistances (the resistance in conductive state). If the drive signals causing no voltage conversion are continuously inputted to all switching devices, larger current flows in the switching device having a lower on-resistance, resulting in concentration of heat generation in such a switching device. According to the present invention, such concentration of heat generation can be avoided by inputting the drive signal intermittently to a switching device having a lower on-resistance or a relatively high temperature. Further, even if no current flows through the switching device regardless of input of the drive signal, the ability of the controller to intermittently output the drive signal enhances the degree of freedom of the direct couple control by the controller.

The method may further comprise the step of, during the direct couple control, charging the power storage device with electric power generated by the fuel cell.

The method may further comprise the step of maximizing current generated by the fuel cell, by executing the direct couple control.

The method may further comprise the step of executing the direct couple control when the fuel cell is in idle-stop mode.

In the idle-stop mode, gas supply from an air compressor to the fuel cell or gas supply from a hydrogen tank to the fuel cell may be stopped.

The method may further comprise the step of executing the direct couple control during a regeneration process of the driving motor.

The method may further comprise the step of executing the direct couple control when the fuel cell drives the driving motor and charges the power storage device.

In a method of controlling a DC/DC converter apparatus according to the invention, the DC/DC converter apparatus includes a DC/DC converter having a plurality of switching devices connected in parallel between a first electric power device and a second electric power device, and a controller for outputting drive signals to the switching devices and controlling voltage conversion of the DC/DC converter. The method comprises the steps of executing, by the controller, direct couple control in which the first and second electric power devices are directly coupled without causing the DC/DC converter to convert voltage, and during the direct couple control, intermittently outputting a drive signal that causes no voltage conversion, to at least one of the switching devices.

According to the present invention, the drive signal (of 100% duty ratio, for example) that causes no voltage conversion can be intermittently outputted to at least one of the plurality of switching devices. During direct couple control, no current flows through the switching device to which drive signal causing no voltage conversion is not inputted. Hence, compared to the case that such drive signals are continuously inputted to all of the switching devices, and thus, heat generation in the switching device to which such a drive signal is not inputted can be reduced. Generally, the switching devices have different on-resistances (the resistance in conductive state). If the drive signals causing no voltage conversion are continuously inputted to all switching devices, larger current flows in the switching device having a lower on-resistance, resulting in concentration of heat generation in such a switching device. According to the present invention, such concentration of heat generation can be avoided by inputting the drive signal intermittently to a switching device having a lower on-resistance or a relatively high temperature. Further, even if no current flows through the switching device regardless of input of the drive signal, the ability of the controller to intermittently output the drive signal enhances the degree of freedom of the direct couple control by the controller.

The method may further comprise the step of intermittently outputting the drive signal to each of all the switching devices during the direct couple control. This ensures that each switching device has a switching cycle during which no drive signal is inputted and, in such a switching cycle, no current flows through a corresponding switching device. Hence, heat generation due to flowing current can be reduced, and each switching device can be kept at a low temperature.

The method may further comprise the step of, during the direct couple control, outputting the drive signal to only one of the switching devices in each switching cycle. In this case, only one switching device driven by the drive signal generates heat due to flowing current, and heat generation in the other switching devices is suppressed. As a result, the heat generation period of each switching device can be decreased, and the heat releasing period increased. Hence, the heat release effect can be improved.

The method may further comprise the step of, during the direct couple control, outputting the drive signals to the switching devices in a fixed order. This allows the heat release period of each switching device to be dispersed, and the concentration of heat generation can be avoided.

The DC/DC converter may be capable of performing voltage-increasing and voltage-decreasing operations, and the controller may be capable of executing voltage-increasing control and voltage-decreasing control that cause the DC/DC converter to perform the voltage-increasing operation and the voltage-decreasing operation, respectively. The method may further comprise the step of outputting, by the controller, the drive signals to the switching devices in the same order during each of the voltage-increasing control, the voltage-decreasing control, and the direct couple control. In this case, the voltage-increasing chopper control, voltage-decreasing chopper control, and direct couple control have a commonality, which facilitates transition from the voltage-increasing or voltage-decreasing chopper control to the direct couple control, and vice versa.

The method may further comprise the step of during the direct couple control, simultaneously with stopping output of the drive signal to one switching device, starting output of the drive signal to another switching device. This allows smooth flow of current when switching between the switching devices.

Preferably, the plurality of switching devices is fixed on a common heat sink. This allows a simple design for heat release.

Preferably, the DC/DC converter apparatus may further include temperature sensors for measuring temperatures of the plurality of switching devices. The method may further comprise the step of, by the controller, stopping operation of a switching device having a temperature higher than a predetermined threshold and causing a switching device having a temperature lower than the predetermined threshold to operate. In this way, the operation of the switching device having a temperature above the predetermined threshold can be stopped while maintaining the direct couple control. Hence, the reliability of the DC/DC converter apparatus can be improved.

The first electric power device may be a power storage device and the second electric power device may be a power generating device, and, the method may further comprise the step of, during the direct couple control, charging the power storage device with power generated by the power generating device. In this configuration, since, in the direct control, the drive signals are inputted to the switching devices intermittently on a one switching cycle basis, the heat generation of the switching device can be reduced. Hence, heat generated by the current flowing from the power generating device to the power storage device for charging the power storage device can be prevented from damaging the switching devices. Therefore, interruption of charging the power storage device by the power generating device due to the damage of the switching device can be prevented, and the power storage device can be charged satisfactorily.

The above and other objects features and advantages of the present invention will become more apparent from the following description when taken in conjunction with the accompanying drawings in which preferred embodiments of the present invention is shown by way of illustrative example.

BRIEF DESCRIPTION OF THE DRAWINGS

FIG. 3 is a flow chart illustrating the basic control of a DC/DC converter incorporated in the fuel cell vehicle;

FIG. 9 is a schematic diagram illustrating the heat release of three phase arms when rotationally turned on in the order of U-phase→V-phase→W-phase→U-phase, and so on;

DESCRIPTION OF THE PREFERRED EMBODIMENTS

A. Embodiment

Hereinafter, a fuel cell vehicle equipped with an embodiment of a DC/DC converter apparatus according to the present invention will be described, with reference to the accompanying drawings.

1. Configuration of Fuel Cell Vehicle 20

(1) General Configuration

Figure 1:
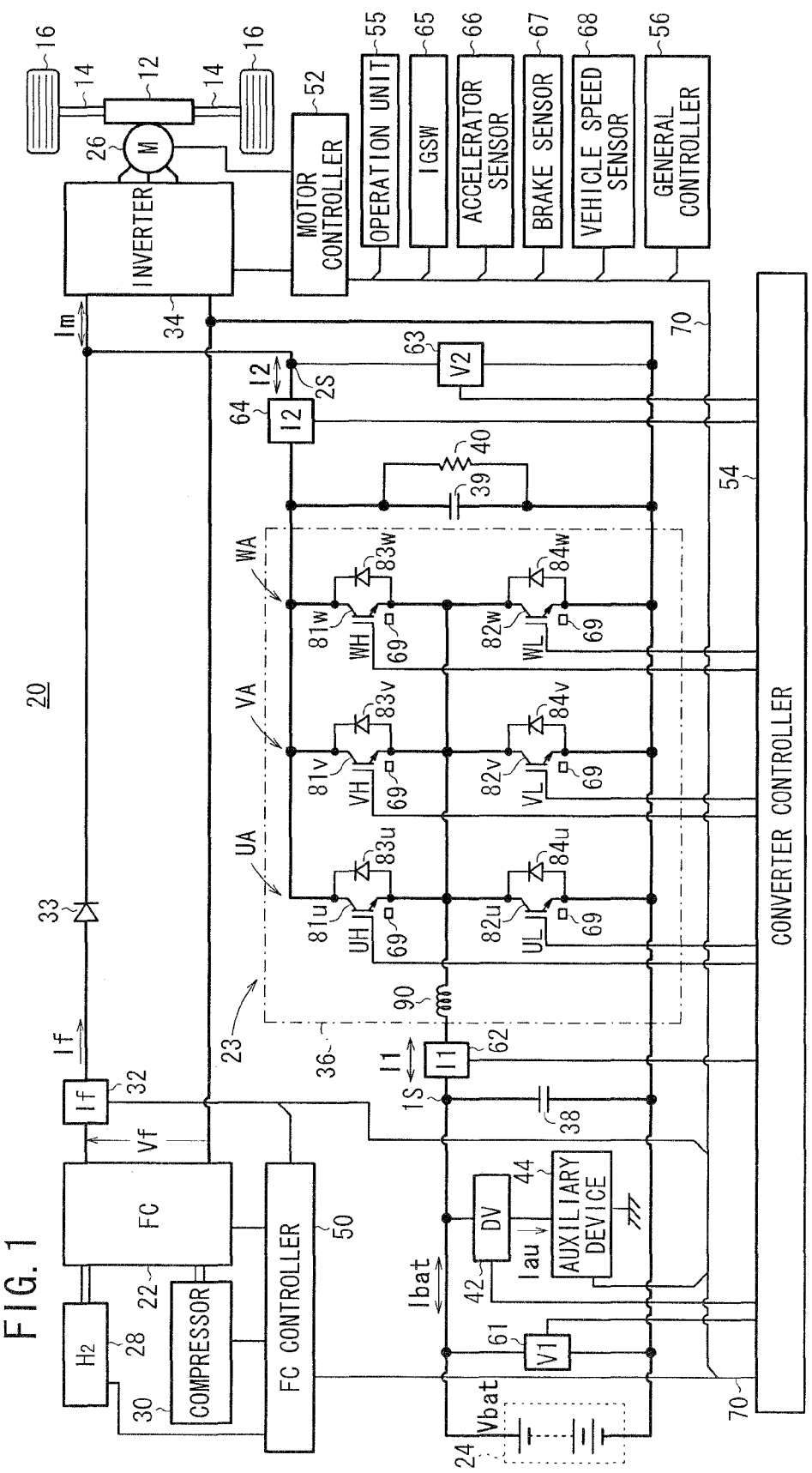
FIG. 1 is a circuit diagram of a fuel cell vehicle equipped with a DC/DC converter apparatus according to an embodiment of the present invention.

FIG. 1 is a circuit diagram of the fuel cell vehicle 20 equipped with a DC/DC converter apparatus 23 according to the present embodiment. The fuel cell vehicle 20 basically includes a hybrid electric power device, a travel motor 26, and a DC/DC converter apparatus (also referred to as a "VCU (Voltage Control Unit)") 23. The hybrid electric power supply device is made up of a fuel cell 22 and a power storage device 24 (referred to as a "battery"). The power storage device 24 serves as an energy storage. The travel motor 26 is supplied with current (electrical power) from the hybrid electric power supply device via an inverter 34. The DC/DC converter apparatus 23 has a primary side 1S connected to the battery 24 and a secondary side 2S connected to the fuel cell 22 and the motor 26 (inverter 34). The VCU 23 converts voltage between the primary side 1S and secondary side 2S. The rotation of the motor 26 is transmitted to wheels 16 through reduction gearing 12 and a shaft 14.

(2) Fuel Cell 22

The fuel cell 22 has a stack structure formed by stacking a plurality of cells. Each cell includes an anode, a cathode, and a solid polymer electrolyte membrane interposed between the anode and the cathode. The fuel cell 22 is connected to a hydrogen tank 28 and an air compressor 30 via pipes. Pressurized hydrogen is supplied from the hydrogen tank 28 to the anode of the fuel cell 22, and air is supplied by the air compressor 30 to the cathode of the fuel cell 22. In the fuel cell 22, generated current If is generated by electrochemical reaction between a reactant gas, i.e. hydrogen (fuel gas) and air (oxygen-containing gas). The generated current If is supplied through a current sensor 32 and a diode (also called disconnecting diode) 33 to the inverter 34 and/or the DC/DC converter 36 of the VCU 23.

(3) Battery 24

The battery 24 connected to the primary side 1S may comprise a lithium ion secondary battery or a nickel-metal hydride secondary battery, a capacitor, or the like. In the present embodiment, a lithium ion secondary battery is employed.

The battery 24 supplies auxiliary devices 44 with auxiliary device current Iau via a downverter 42. The auxiliary devices 44 include lights, power windows, motors for wipers, and the like. The battery 24 also supplies the inverter 34 with motor current Im via the DC/DC converter 36 of the VCU 23.

(4) Inverter 34 and Downverter 42

The inverter 34 converts the motor current Im from direct current to alternating current and supplies the motor current Im to the motor 26. The inverter 34 also converts the motor current Im from alternating current to direct current during a regenerative operation to supply the motor current Im from the secondary side 2S to the primary side 1S through the DC/DC converter 36.

In this case, the secondary voltage V2 is the regenerative voltage or power generation voltage Vf of the fuel cell 22, and is converted into low primary voltage V1 by the DC/DC converter 36. The primary voltage V1 produces battery current Ibat, with which the battery 24 is charged. The primary voltage V1 is further converted into a lower voltage by the downverter 42 and then supplied to the auxiliary devices 44 as the auxiliary device current Iau.

(5) VCU 23

The VCU 23 is made up of the DC/DC converter 36 and a converter controller 54 for controlling the DC/DC converter 36.

The DC/DC converter 36 includes three phase arms that are connected in parallel between the battery 24 (first electric power device) and a second electric power device (the fuel cell 22 or the regenerative power supply (the inverter 34 and the motor 26)). The three phase arms include a U-phase arm UA ($81u$, $82u$), a V-phase arm VA ($81v$, $82v$), and a W-phase arm WA ($81w$, $82w$), each including an upper arm device 81 ($81u$, $81v$, $81w$) and a lower arm device 82 ($82u$, $82v$, $82w$). Each arm device is a switching device such as an IGBT.

Diodes $83u$, $83v$, $83w$, $84u$, $84v$, $84w$ are connected inversely across the respective arm devices $81u$, $81v$, $81w$, $82u$, $82v$, $82w$.

For ease of understanding, the upper arm devices 81 and lower arm devices 82 in the present invention do not comprise any antiparallel diodes 83, 84.

A single reactor 90 is disposed between the battery 24 and a common line connecting the midpoint of each phase arm of the three phase arms (U-phase arm UA, V-phase arm VA, W-phase arm WA). This reactor 90 stores and releases energy during the voltage conversion between the primary voltage V1 and the secondary voltage V2 by the DC/DC converter 36.

The upper arm devices 81 ($81u$ to $81w$) are driven by (the high level of) gate drive signals (drive voltages) UH, VH, WH, respectively, output from the converter controller 54, and the lower arm devices 82 ($82u$ to $82w$) are driven by (high-level) gate drive signals (drive voltages) UL, VL, WL, respectively, also output from the converter controller 54.

Each arm device $81u$ to $81w$, $82u$ to $82w$ is provided with a temperature sensor 69. Each temperature sensor 69 and the gate terminal of each arm device $81u$ to $81w$, $82u$ to $82w$ are connected to the converter controller 54. Note that the connection between each temperature sensor 69 and the converter controller 54 is omitted from FIG. 1.

Figure 2A:
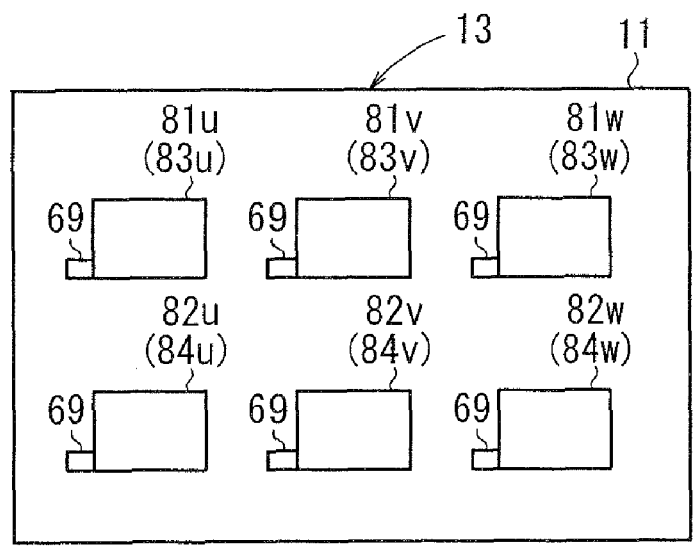
FIG. 2A is a plan view illustrating an arrangement of upper and lower arm devices on a heat sink.
Figure 2B:
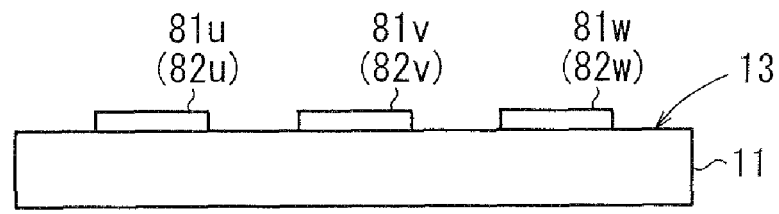
FIG. 2B is a side view illustrating an arrangement of upper and lower arm devices on a heat sink.

As shown in FIGS. 2A and 2B, the arm devices $81u$ to $81w$, $82u$ to $82w$ are attached on a metallic heat sink (heat spreader) 11, forming a so-called 6-in-1 module 13. Each arm device $81u$ to $81w$, $82u$ to $82w$ is provided with a temperature sensor 69. Each temperature sensor 69 and the gate terminal of each arm device $81u$ to $81w$, $82u$ to $82w$ are connected to the converter controller 54. Note that each of the diodes $83u$ to $83w$, $84u$ to $84w$ connected to the arm devices $81u$ to $81w$, $82u$ to $82w$ is omitted from FIGS. 2A and 2B.

The converter controller 54 controls the operation of the DC/DC converter 36. The method of controlling the DC/DC converter 36 will be described later.

(6) Capacitor 38, 39 and Resistor 40

The primary side 1S and the secondary side 2S are provided with smoothing capacitors 38, 39, respectively. The capacitor 39 on the secondary side 2S is connected in parallel with a resistor 40.

(7) Controllers (FC Controller 50, Motor Controller 52, Converter Controller 54, General Controller 56)

A system including the fuel cell 22, the hydrogen tank 28, and the air compressor 30 is controlled by the FC controller 50. A system including the inverter 34 and the motor 26 is controlled by the motor controller 52 that includes an inverter driver (not shown). As mentioned above, the system including the DC/DC converter 36 is controlled by the converter controller 54.

The FC controller 50, the motor controller 52, and the converter controller 54 are controlled by the general controller 56, which serves as a higher level controller that determines the value of a total load requirement Lt of the fuel cell 22, and the like.

The general controller 56 adjusts and determines the total load requirement Lt on the fuel cell vehicle 20 based on the states of the fuel cell 22, battery 24, motor 26, and auxiliary devices 44, as well as inputs from various switches and sensors (load requirements), and determines the allocation of the total load requirement Lt among the fuel cell allocated load (required output) Lf to be borne by fuel cell 22, a battery allocated load (required output) Lb to be borne by the battery 24, and a regenerative power supply allocated load Lr to be borne by the regenerative power supply. The general controller 56 also sends commands to the FC controller 50, motor controller 52, and converter controller 54.

Each of the general controller 56, the FC controller 50, the motor controller 52, and the converter controller 54 includes a CPU, a ROM, a RAM, and a timer, input-output interfaces such as an analog-to-digital (A/D) converter and a digital-to-analog (D/A) converter, and also, if necessary, a digital signal processor (DSP) or the like.

The general controller 56, the FC controller 50, the motor controller 52, and the converter controller 54 are connected to each other by communication lines 70, which serve to define a CAN (Controller Area Network) as an intravehicular LAN, and perform various functions by sharing input and output information from various switches and various sensors, and by executing programs stored in ROMs under the control of CPUs based on the input and output information from the various switches and various sensors.

(8) Switches and Sensors

Switches and sensors for detecting vehicle states include, in addition to the current sensor 32 for detecting the generated current If, a voltage sensor 61 for detecting the primary voltage V1 (basically the same as the battery voltage Vbat), a current sensor 62 for detecting the primary current I1, a voltage sensor 63 for detecting the secondary voltage V2 (substantially the same as the generated voltage Vf of the fuel cell 22 when the disconnecting diode 33 is in a conduction state), a current sensor 64 for detecting the secondary current I2, an ignition switch 65, an accelerator sensor 66, a brake sensor 67, a vehicle speed sensor 68, a temperature sensor 69 connected to the converter controller 54, an operation unit 55 of the auxiliary devices 44, and the like, each of which are connected to the communication lines 70.

2. Control/Processes (1) Basic Voltage Control in VCU 23

FIG. 3 is a flow chart illustrating basic operation of the DC/DC converter 36 that is controlled by the converter controller 54.

As described above, the general controller 56 determines the total load requirement Lt of the fuel cell vehicle 20 based on the states of the fuel cell 22, battery 24, motor 26, and auxiliary devices 44, as well as the inputs from various switches and sensors (load requirements), and then adjusts and determines the allocation of the total load requirement Lt of the fuel cell vehicle 20 among the fuel cell allocated load (required output) Lf to be borne by the fuel cell 22, a battery allocated load (required output) Lb to be borne by the battery 24, and a regenerative power supply allocated load Lr to be borne by the regenerative power supply, and sends commands to the FC controller 50, motor controller 52, and converter controller 54.

Figure 4:
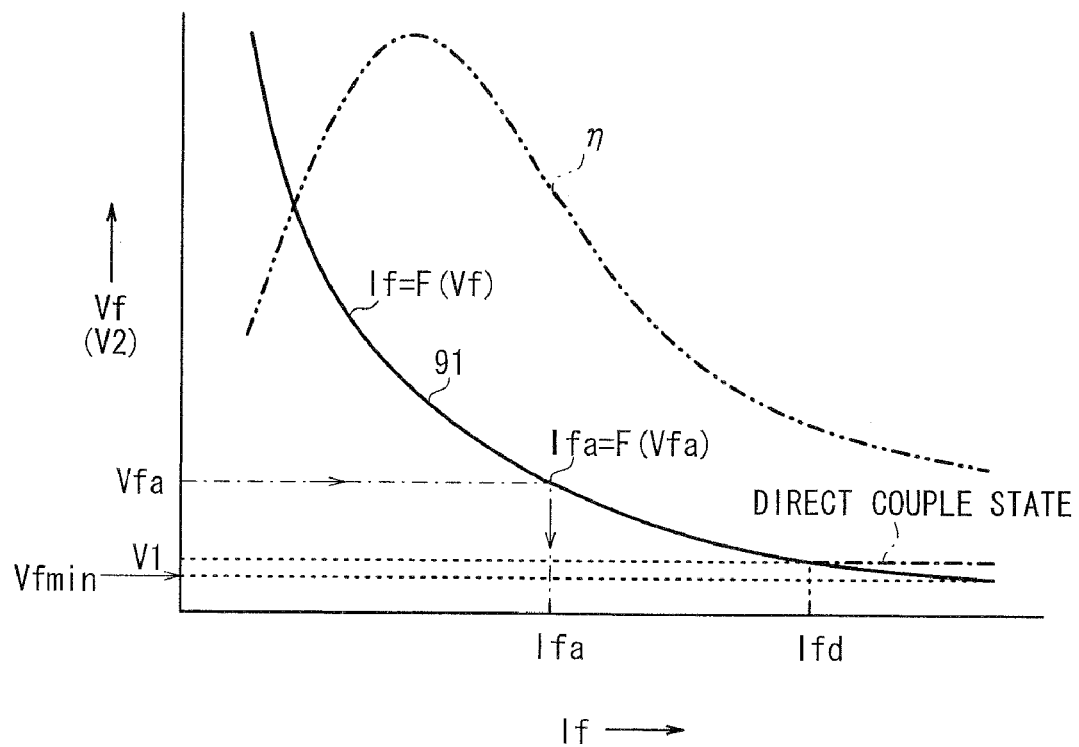
FIG. 4 is a diagram illustrating a current-voltage characteristic curve of a fuel cell.

In step S1, the general controller 56 determines (calculates) the total load requirement Lt from the power requirement of the motor 26, the power requirement of the auxiliary devices 44, and the power requirement of the air compressor 30, all of which represent load requirements. In step S2, the general controller 56 determines the allocation of the total load requirement Lt among the fuel cell allocated load Lf, the battery allocated load Lb, and the regenerative power supply allocated load Lr. When the fuel cell allocated load Lf is determined, the efficiency $\eta$ (FIG. 4) of the fuel cell 22 is taken into account.

Then, in step S3, the converter controller 54 determines the generated voltage Vf of the fuel cell 22, which is the secondary voltage V2 in the present case, in accordance with the fuel cell allocated load Lf.

Once the secondary voltage V2 has been determined, the converter controller 54 operates, in step S4, the DC/DC converter 36 so as to obtain the determined secondary voltage V2. As a result, the DC/DC converter 36 performs a voltage-increasing, voltage-decreasing operation and the like (the detail of which will be described later).

The secondary voltage V2 and the primary voltage V1 are controlled by the converter controller 54, which operates the DC/DC converter 36 based on PID control that is a combination of feedforward control and feedback control.

(2) Output Control of Fuel Cell 22

Next, the output control of the fuel cell 22 by the VCU 23 will be described.

Fuel gas and compressed air are supplied from the hydrogen tank 28 and the air compressor 30, respectively, to the fuel cell 22 to generate power. During power generation, the generated current If of the fuel cell 22 is determined by the converter controller 54 that sets the secondary voltage V2, i.e. the power generating voltage Vf, on the characteristic curve 91 (also called function F(Vf)) shown in FIG. 4 through the DC/DC converter 36. In other words, the generated current If value is determined as the function F(Vf) of the generated voltage Vf. Since If=F(Vf), if the power generation voltage Vf is set to Vf=Vfa=V2, the generated current Ifa is given by Ifa=F(Vfa)=F(V2).

Since the generated current If of the fuel cell 22 can be controlled by determining the secondary voltage V2 (generated voltage Vf), the operation of the fuel cell vehicle 20 can be controlled by setting the secondary voltage V2 (generated voltage Vf) to a target voltage (target value).

In a system including the fuel cell 22, such as the fuel cell vehicle 20, the VCU 23 is controlled so that the secondary voltage V2 at the secondary side 2S of the DC/DC converter 36 becomes the target voltage, and consequently the VCU 23 controls the output of the fuel cell 22 (the generated current If).

(3) Switching Control of DC/DC Converter 36

(a) Overview

The switching control of the DC/DC converter according to the present embodiment includes (i) voltage-decreasing chopper control that turns on one of the upper arm devices 81u, 81v, 81w during a part of each switching cycle $T_{SW}$ [µs], (ii) voltage-increasing chopper control that turns on one of the lower arm devices 82u, 82v, 82w during a part of each switching cycle $T_{SW}$, (iii) direct couple control that allows current to flow through the DC/DC converter 36 without performing the voltage-increasing chopper control or voltage-decreasing chopper control, and (iv) halt control that prevents any current from flowing through the DC/DC converter 36.

(b) Synchronous Switching Process

Figure 5:
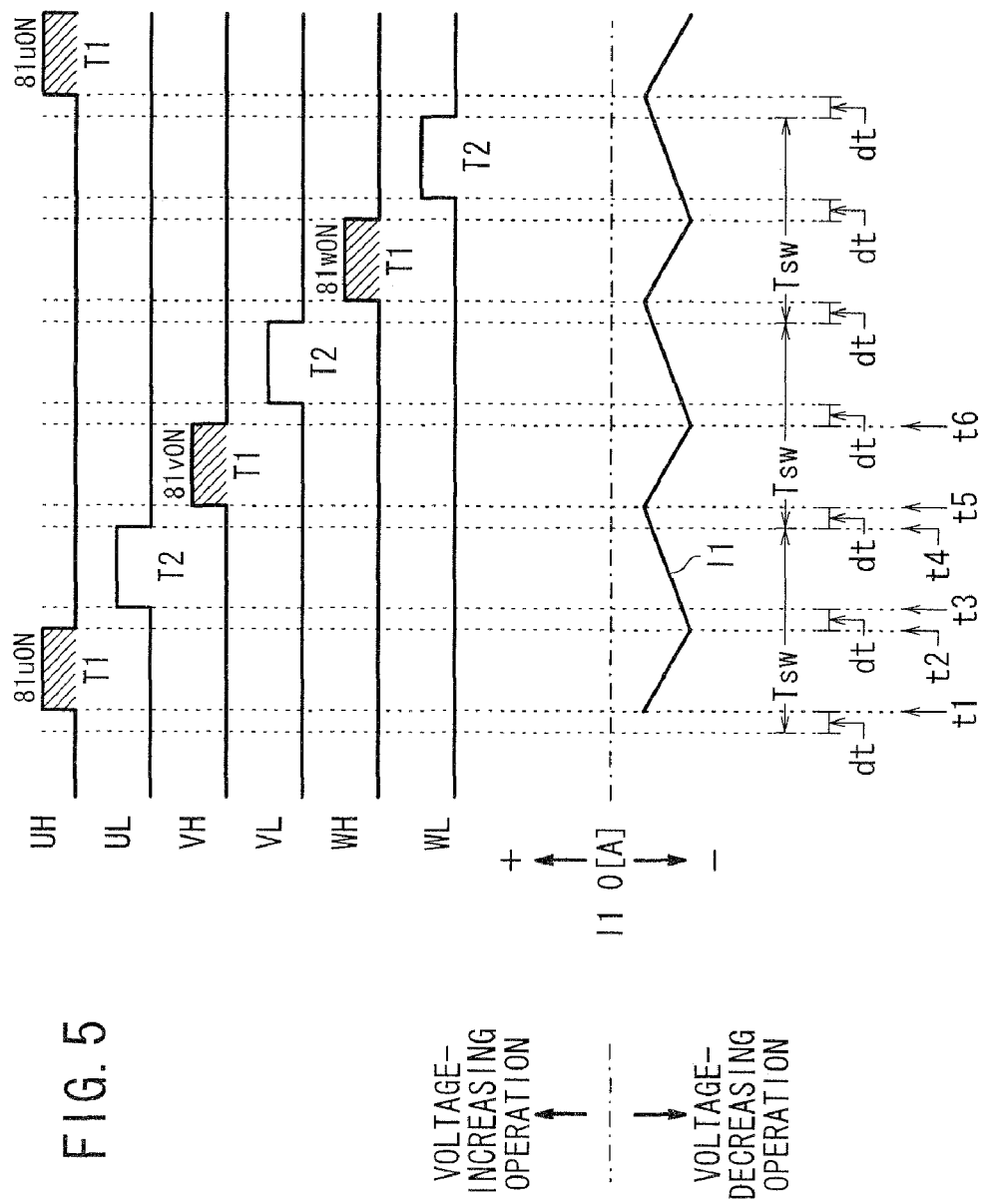
FIG. 5 is a timing chart illustrating a voltage-decreasing operation of the DC/DC converter.
Figure 6:
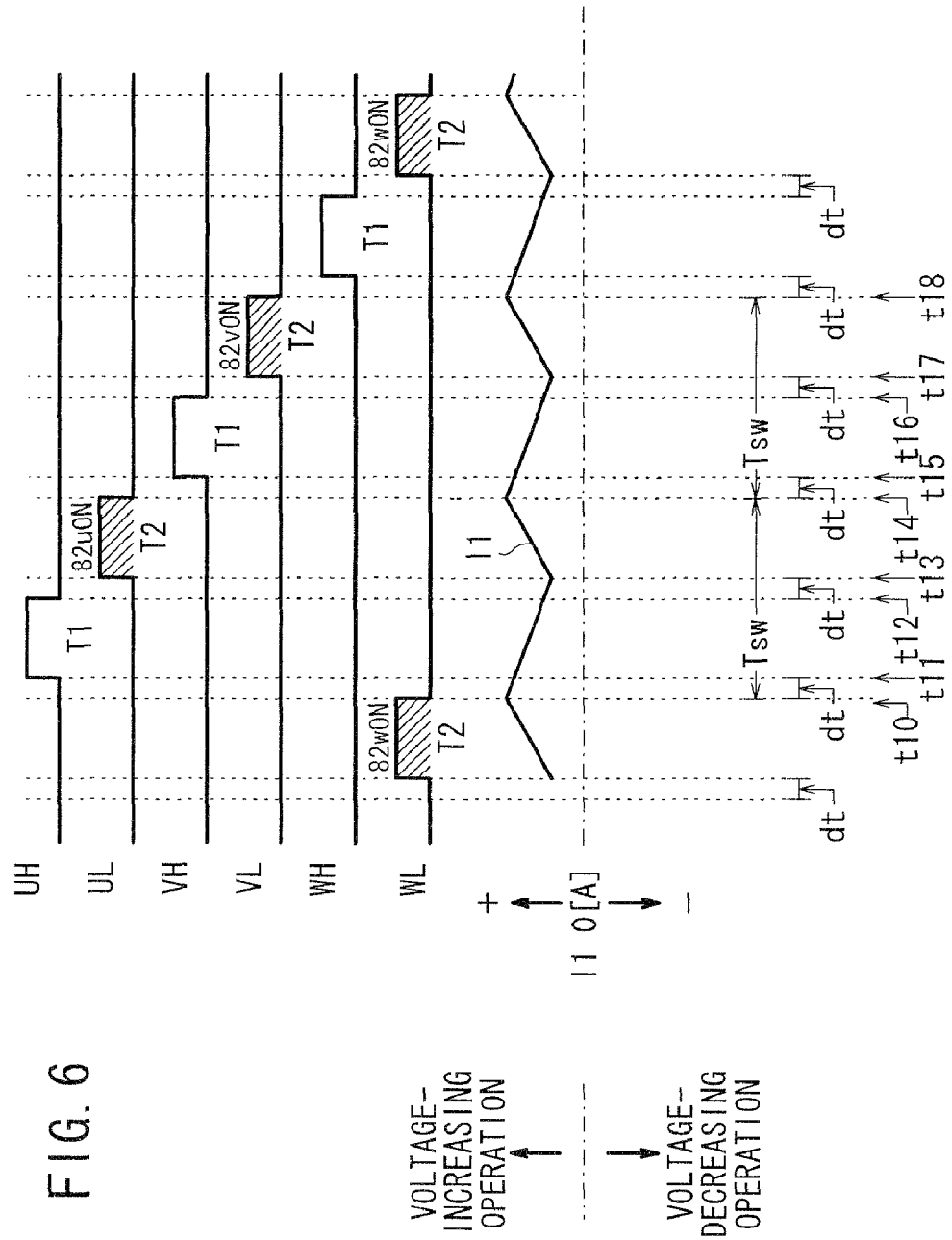
FIG. 6 is a timing chart illustrating a voltage-increasing operation of the DC/DC converter.

As shown in FIGS. 5 and 6, the above-mentioned voltage-decreasing chopper control and voltage-increasing chopper control are used in combination in each switching cycle $T_{SW}$. Specifically, each switching cycle $T_{SW}$ includes both a driving period of the upper arm device 81u to 81w (hereinafter referred to as "upper arm device driving period T1") and a driving period of the lower arm device 82u to 82w (hereinafter referred to as "lower arm device driving period T2"), so that the upper arm device 81u to 81w and the lower arm device 82u to 82w are driven alternately. The process in which the upper arm device 81u to 81w and the lower arm device 82u to 82w are driven alternately in each switching cycle $T_{SW}$ is called a "synchronous switching process".

A dead time dt is provided between the upper and lower arm device driving periods T1 and T2 to prevent short circuits which can occur in the VCU 23 if the upper arm device 81u to 81w and the lower arm device 82u to 82w are driven simultaneously.

In the synchronous switching process, the upper arm device 81u to 81w and the lower arm device 82u to 82w are alternately driven in each cycle. However, in any given cycle, only one of the upper arm device and the lower arm device is turned on (becomes conductive) due to the potential difference between the primary side 1S and the secondary side 2S.

It should be noted that, in the present embodiment, the converter controller 54 can selectively utilize PWM (Pulse Width Modulation) and PFM (Pulse Frequency Modulation) for generating and outputting the drive signals UH, UL, VH, VL, WH, WL.

In the PWM technique, the switching frequency $F_{SW}$ [Hz], which has substantially the same meaning as the switching cycle $T_{SW}$ [µs], is fixed, and the upper arm device driving period T1, the lower arm device driving period T2, and also the two dead times dt, if required, are varied to control the operation of the upper arm devices 81u to 81w and the lower arm devices 82u to 82w, and thus the voltage-increasing and voltage-decreasing operations of the DC/DC converter 36 are controlled.

In the PFM technique, one of the upper and lower arm device driving periods T1 and T2 is fixed, and the ON/OFF operation of the upper arm devices 81u to 81w and lower arm devices 82u to 82w is controlled by varying the switching cycle $T_{SW}$, and hence the voltage-increasing and voltage-decreasing operations of the DC/DC converter 36, are controlled.

(c) Voltage-decreasing Chopper Control

FIG. 5 is a diagram illustrating the voltage-decreasing chopper control, where the upper arm devices 81u to 81w are in conductive state while the lower arm devices 82u to 82w are not. In FIG. 5, the hatched areas in the drive signals UH, UL, VH, VL, WH, WL indicate periods for which the arm devices provided with the drive signals are conductive, i.e. the periods for which current actually flows in the corresponding arm devices (where the arm device corresponding to the drive signal UH is the upper arm device 81u and so on).

When the upper arm device 81u to 81w is conductive, the secondary current I2 is supplied from the secondary side 2S to the primary side 1S (i.e. the secondary current is sunk), and voltage-decreasing operation is performed by so-called voltage-decreasing chopper control. For example, when the upper arm device 81u is turned on from time t1 to t2 in FIG. 5, the reactor 90 is charged with the secondary current I2 from the capacitor 39, and the capacitor 38 supplies the primary current I1 to the battery 24 and the auxiliary devices 44. Then, the diodes 84u to 84w become conductive and serve as freewheel diodes, allowing the reactor 90 to discharge energy, and the capacitor is charged and the primary current I1 is supplied to the battery 24 and the auxiliary devices 44. From time t5 to t6, the upper arm device 81v is turned on, to sink (i.e., supply) the secondary current, to the battery 24 and the auxiliary devices 44 in the same manner as described above. Thus, in the present embodiment, the three upper arm devices 81u to 81w are turned on in rotation (also called "rotational switching").

If there is regenerative power, the regenerative power supply allocated load Lr is added to the sinking secondary current during the voltage-reducing operation. Further, the driving periods of the upper arm devices 81u to 81w and the lower arm devices 82u to 82w are determined to keep the output voltage at V2.

The lower side of FIG. 5 shows a timing chart of the primary current I1 during the voltage-decreasing operation of the VCU 23.

In FIG. 5, the primary current I1 flowing through the reactor 90 has a positive (+) sign when the primary current I1 flows from the primary side 1S to the secondary side 2S in the voltage increasing operation (wherein source current flows from the secondary side 2S of the DC/DC converter 36 to the inverter 34). The primary current I1 has a negative sign (−) when the primary current I1 flows from the secondary side 2S to the primary side 1S in the voltage reducing operation (wherein sink current flows from the fuel cell 22 or the inverter 34 to the secondary side 2S of the DC/DC converter 36). This also applies to FIGS. 6 through 8 similarly.

(d) Voltage-increasing Chopper Control

FIG. 6 is a diagram illustrating the voltage-increasing chopper control, where the lower arm devices 82u to 82w are in conductive state while the upper arm devices 81u to 81w are not. Like in FIG. 5, the hatched areas in FIG. 6 indicate the periods during which the arm devices are conductive.

When the lower arm device 82u to 82w is conductive, current flows from the primary side 1S to the secondary side 2S, and voltage-increasing operation is performed under so-called voltage-increasing chopper control. For example, when the lower arm device 82u is turned on from time t13 to t14 in FIG. 6, the reactor 90 is stored with the primary current I1 produced by subtracting the auxiliary current Iau from the battery current Ibat, while the capacitor 39 supplies the secondary current I2 to the inverter 34 side (i.e. current is sourced). Then, the diodes 83u to 83w, serving as rectifier diodes, become conductive, allowing the reactor 90 to discharge energy, and the capacitor 39 is stored with and the secondary current I2 is sourced to the inverter 34. Then, from time t17 to t18, the lower arm device 82v is turned on, and the secondary current I2 is sourced to the inverter 34 side in the same manner as described above. As with the three upper arm devices 81u to 81w, the three lower arm devices 82u to 82w are switched in rotation.

Note that the upper arm device driving period T1 (the period of time for driving the upper arm device 81u to 81w) and the lower arm device driving period T2 (the period of time for driving the lower arm device 82u to 82w) are determined so as to keep the output voltage at the level V2.

(e) Direct Couple Control

As described above, the present embodiment may employ a direct couple control for flowing current through the DC/DC converter 36 without performing the voltage-decreasing or voltage-increasing chopper control, i.e. without performing voltage conversion. In the direct couple control, the upper arm device driving period T1 occupies the entire part of each switching cycle $T_{SW}$, and the lower arm device driving period T2 and the two dead times dt are zero, for example. In other words, the drive signals UH, VH, WH for the upper arm devices 81u to 81w have a duty ratio of 100%.

Figure 7:
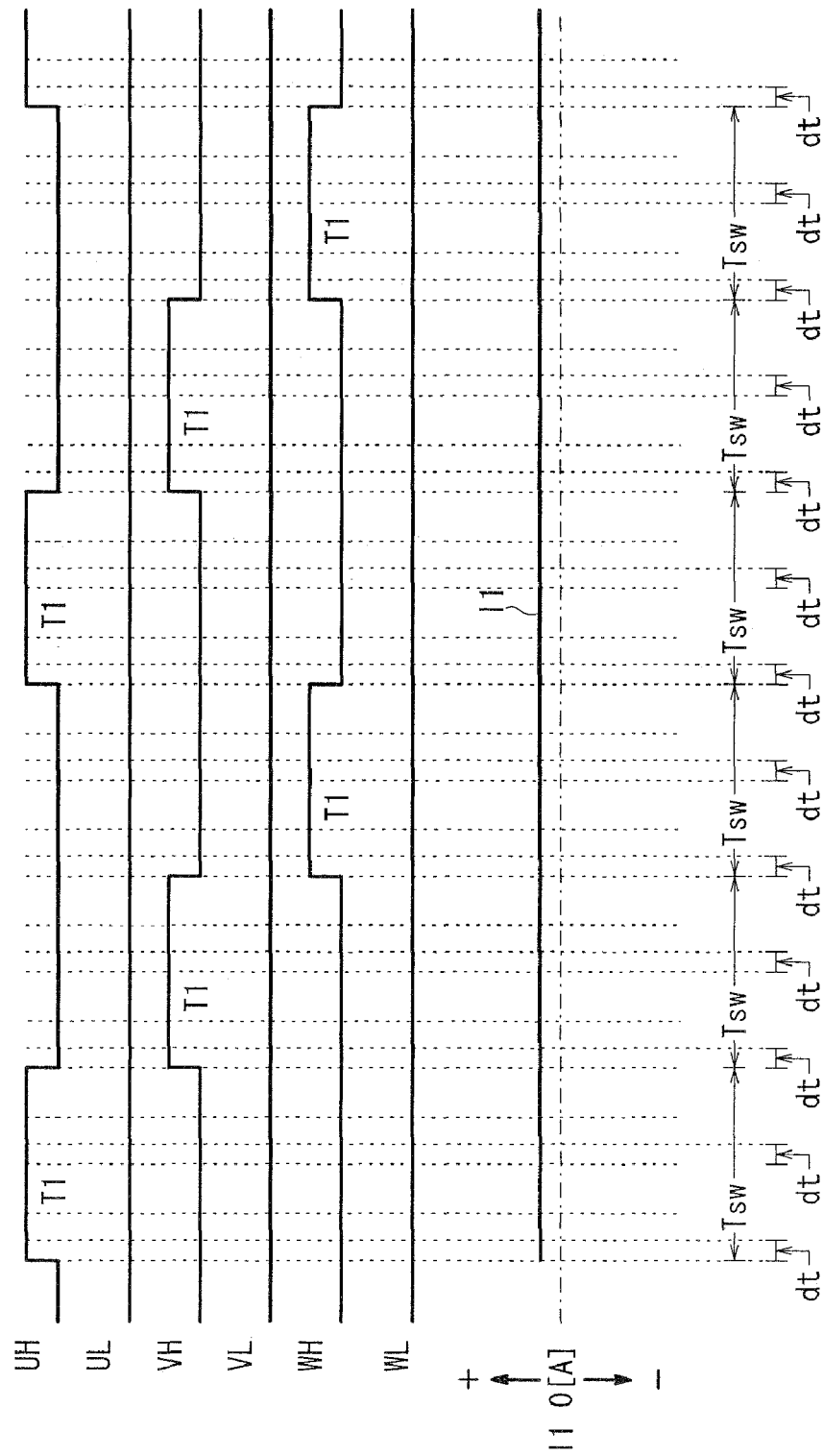
FIG. 7 is a timing chart illustrating a first direct couple process of the DC/DC converter.

The direct couple control includes first direct couple control and second direct couple control. In the first direct couple control, the diodes 83u to 83w are ON, and current flows from the primary side 1S (battery 24) to the secondary side 2S (motor 26). In the second direct couple control, the upper arm devices 81u to 81w are turned on, and current flows from the secondary side 2S (motor 26, fuel cell 22) to the primary side 1S (battery 24). FIG. 7 shows a timing chart of the first direct couple control, and FIG. 8 shows a timing chart of the second direct couple control.

The first direct couple control is used for supplying high power to the motor 26, for example, and the secondary current I2 from the secondary side 2S of the DC/DC converter 36 is sourced to the inverter 34. As can be seen from the fuel cell output characteristic curve (current-voltage characteristic curve) 91 shown in FIG. 4, the fuel cell 22 can supply larger current as the generated voltage Vf of the fuel cell 22 approaches the minimum voltage Vfmin. The primary voltage V1 is set at a value higher than the minimum generated voltage Vfmin of the fuel cell 22. Hence, direct couple of the primary side 1S and the secondary side 2S maximizes the generated current If of the fuel cell 22, and allows high power to be supplied to the motor 26.

The second direct couple control is employed, for example, when the regeneration process is performed by the motor 26, when the motor 26 is driven and the battery 24 is charged by the fuel cell 22, and when the idle-stop process of the fuel cell 22 is performed. When the regeneration process is performed by the motor 26, the regenerative electric power produced by the motor 26 is supplied to the battery 24 via the DC/DC converter 36 to charge the battery 24. When the motor 26 is driven and the battery 24 is charged by the fuel cell 22, the motor 26 is driven and the battery 24 is charged with the electric power from the fuel cell 22. The idle-stop process is a process that charges the battery 24 with the generated voltage Vf (generated current If) of the fuel cell 22 during idle stop and thereby discharges the fuel cell 22. Note that idle stop refers to stopping the air supply from the air compressor 30 and the fuel gas supply from the hydrogen tank 28 with the ignition switch 65 (see FIG. 1) ON. It should be also noted that the second direct couple control allows the battery 24 to be charged and electric power to be supplied to the auxiliary devices 44.

Figure 8:
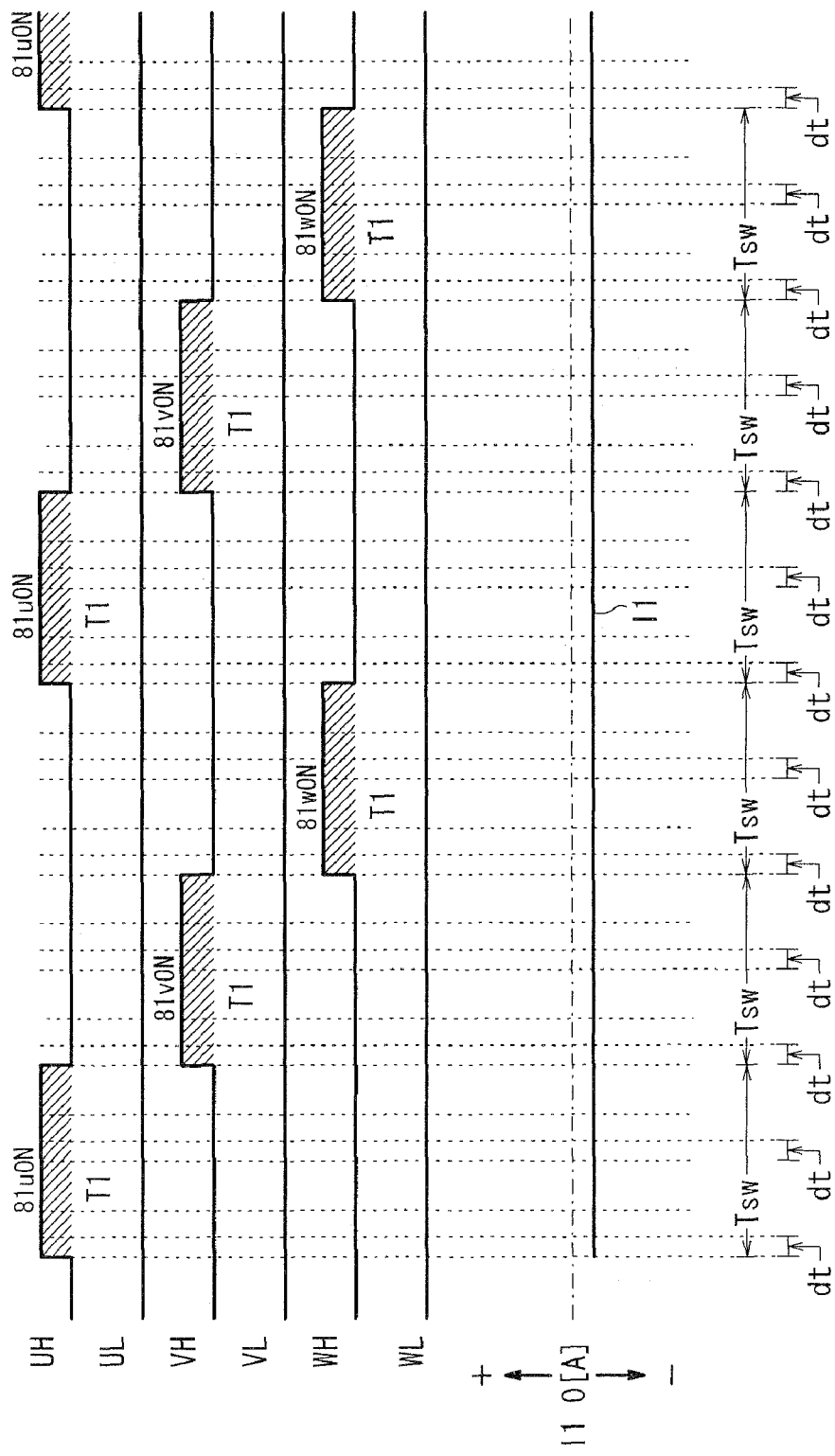
FIG. 8 is a timing chart illustrating a second direct couple process of the DC/DC converter.

As shown in FIGS. 7 and 8, the present embodiment performs the rotational switching also in both of the first and second direct couple controls. Specifically, the drive signals UH, VH, WH are outputted in the order of U-phase→V-phase→W-phase→U-phase, and so on.

Figure 9:
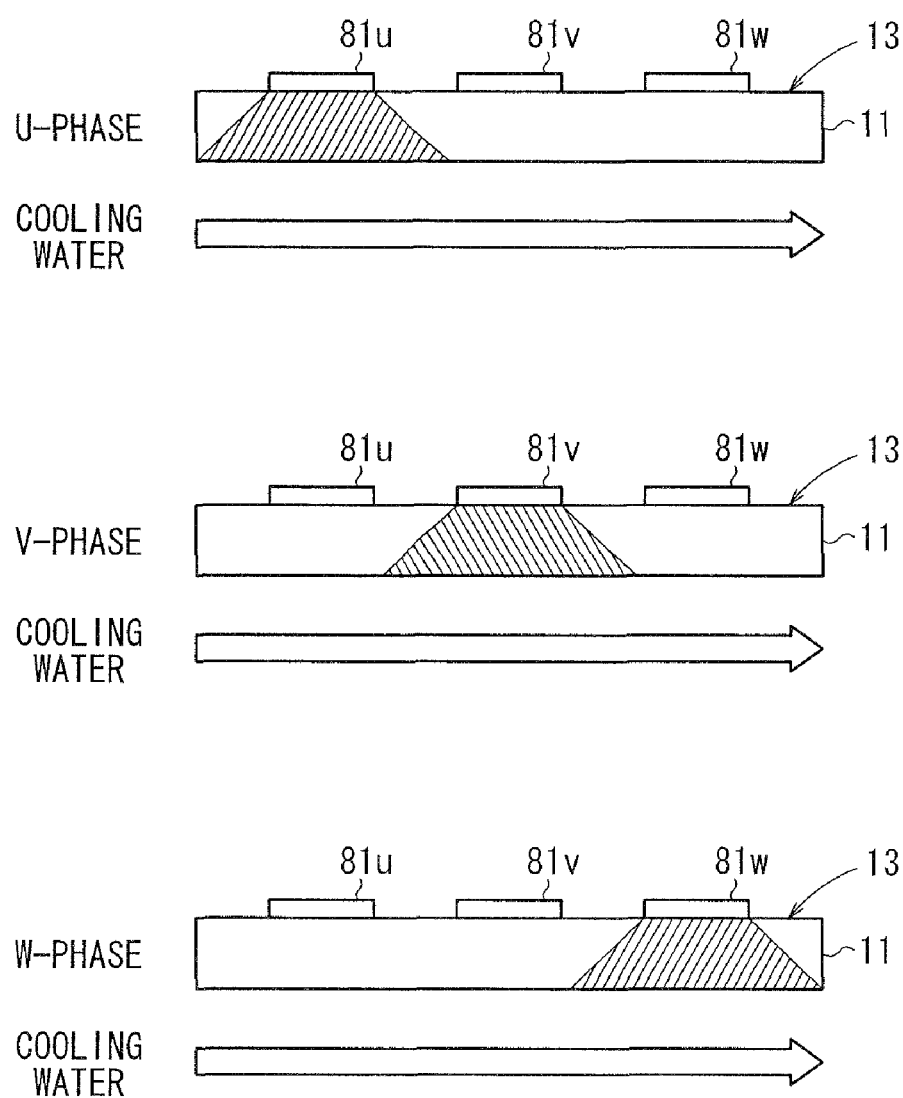
Figure 10:
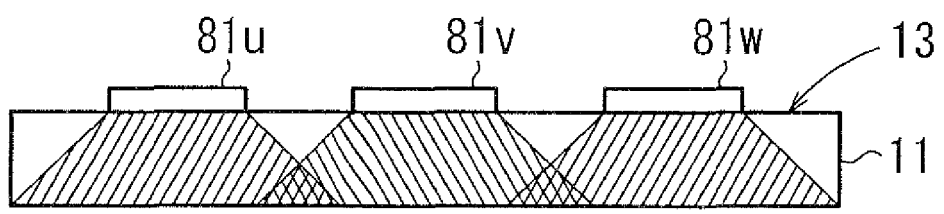
FIG. 10 is a diagram illustrating the heat transfer of switching devices when turned on simultaneously.

FIG. 9 is a schematic diagram illustrating heat release of the upper arm devices 81u to 81w when the three phase arms are turned on in rotation in the order of U-phase→V-phase→W-phase according to the second direct couple control. FIG. 10 is a schematic diagram of a comparative example, illustrating heat release of the upper arm devices 81u to 81w when all of the three phase arms are continuously turned on.

When the upper arm devices 81u to 81w are switched on rotationally, the paths of the heat released from the upper arm devices 81u to 81w have no overlapping portion as shown in FIG. 9, since only one upper arm device 81 is turned on in each switching cycle $T_{SW}$. In FIG. 10, however, the paths of the released heat have overlapping portions as shown by the double-hatched areas (where the surface of the heat sink 11 is utilized in a overlapping way). Therefore, the rotational switching of the upper arm devices 81u to 81w improves the heat release efficiency and allows a smaller and lighter 6-in-1 module 13 to be employed.

Further, the upper arm devices 81u to 81w typically have different on-resistances (the resistance in conductive state). Hence, if all of the upper arm devices 81u to 81w are continuously supplied with drive signals UH, VH, WH having a duty ratio of 100%, as shown in FIG. 10, larger current flows through an upper arm device having a lower on-resistance, causing concentration of heat generation on the upper arm device. The present embodiment, however, prevents heat generation from being concentrated on an upper arm device 81 having a lower on-resistance or a relatively high temperature, by supplying the drive signals UH, VH, WH intermittently to such an upper arm device 81.

3. Advantageous Effects of the Embodiment

As described above, in the embodiment of the present invention, drive signals UH, VH, WH of 100% duty ratio are intermittently outputted to the upper arm devices 81, during the second direct couple control. Therefore, during the second direct couple control, no current flows through the upper arm device 81 to which the drive signal UH, VH, WH of 100% duty ratio is not inputted. Thus, in comparison to a case where drive signals of 100% duty ratio are continuously input to all upper arm devices 81, the heat generation of the upper arm device 81 to which the drive signal of the 100% duty ratio is not input can be prevented. Generally, the upper arm devices 81 have different on-resistances (the resistance in conductive state). If the drive signals having duty ratio of 100% are continuously inputted to all of the upper arm devices 81, larger current flows through an upper arm device 81 having a lower on-resistance, resulting in concentration of heat generation in such an upper arm device 81. According to the present embodiment, such concentration of heat generation can be avoided, for example, by inputting the drive signal UH, VH, WH intermittently to an upper arm device 81 having a lower on-resistance or relatively high temperature. Further, even in the case in which no current flows through the upper arm device 81 regardless of the inputted drive signal UH, VH, WH, as in the first direct couple control, the ability of the converter controller 54 to intermittently output the drive signal UH, VH, WH enhances the degree of freedom of the direct couple control by the converter controller 54.

In the direct couple control, the converter controller 54 intermittently outputs the drive signals UH, VH, WH to the plurality of upper arm devices 81. This ensures that each upper arm device 81 has a switching cycle $T_{SW}$ during which no drive signal UH, VH, WH is inputted, and no current flows in such a switching cycle $T_{SW}$. Hence, heat generation due to flowing current can be suppressed in each upper arm device 81, and each upper arm device 81 can be kept at a low temperature.

In the direct couple control, the converter controller 54 outputs the drive signal UH, VH, WH to only one upper arm device 81 in each switching cycle $T_{SW}$. Hence, only one upper arm device 81 is driven and generates heat due to flowing current, and heat generation can be suppressed in other arm devices 81. As a result, the heat generation period of each upper arm device 81 can be decreased, and the heat release period increased, and hence, the heat release effect can be improved.

In the direct couple control, the converter controller 54 outputs the drive signals UH, VH, WH to the plurality of upper arm devices 81 in a fixed order. This allows the heat release period of each upper arm device 81 to be dispersed, and the concentration of heat generation can be avoided.

The DC/DC converter 36 can perform the voltage-increasing chopper operation and the voltage-decreasing chopper operation. The converter controller 54 can perform the voltage-increasing chopper control and the voltage-decreasing chopper control to cause the converter controller 54 to perform the voltage-increasing chopper operation and the voltage-decreasing chopper operation, respectively. The converter controller 54 outputs the drive signals UH, VH, WH to the plurality of upper arm devices 81 in the same order during each of the voltage-increasing chopper control, voltage-decreasing chopper control, and direct couple control. Hence, the voltage-increasing chopper control, voltage-decreasing chopper control, and direct couple control have a commonality, allowing smooth transition from the voltage-increasing or voltage-decreasing chopper control to the direct couple control, and vice versa.

In the direct couple control, the converter controller 54 immediately starts outputting the drive signal UH, VH, WH to one upper arm device 81 on stopping the output of the drive signal UH, VH, WH to another upper arm device 81 (see FIGS. 7 and 8). This allows smooth flow of current when switching between the upper arm devices 81.

The plurality of upper arm devices 81 are fixed on the same heat sink 11, allowing a simple design for heat release.

When the converter controller 54 is executing the second direct couple control, the battery 24 is charged with the electric power generated by the fuel cell 22 or the motor 26. Since, in the second direct control, the drive signals UH, VH, WH are inputted to the upper arm devices 81 intermittently on a one switching cycle $T_{SW}$ basis, the heat generation of each upper arm device 81 can be reduced. Accordingly, damage to each upper arm device 81 caused by the heat generated due to the current flowing from the fuel cell 22 or motor 26 to the battery 24 for charging the battery 24 can be avoided. Therefore, interruption of charging of the battery 24 by the fuel cell 22 or the motor 26 due to the damage to the upper arm device 81 can be prevented, and the battery 24 can be charged satisfactorily.

B. Variations

The present invention is not limited to the embodiments described above, but can have various other configurations based on the description of the present specification. For example, the following configurations (1) through (5) may be employed.

(1) Object to be Equipped with DC/DC Converter Apparatus 23

While the VCU 23 is incorporated in the fuel cell vehicle 20 in the embodiment described above, the present invention is not limited thereto, and the VCU 23 may also be incorporated in battery driven vehicles (electric cars). The VCU 23 can also be applied to a so-called parallel or series parallel hybrid car that is equipped with an engine, a battery, and a motor.

(2) Phase Arms UA, VA, WA

While the embodiment described above employed phase arms UA, VA, WA of a three-phase type, single-phase, two-phase, or more than three-phase arrangements may be used.

(3) Switching Control

Although the embodiment described above employs a synchronous switching that switches on and off both of the upper arm devices 81u to 81w (voltage-decreasing chopper control) and the lower arm devices 82u to 82w (voltage-increasing chopper control) in each switching cycle $T_{SW}$, the present invention is not limited thereto, and the present invention may be applied to only one of the voltage-decreasing chopper control and the voltage-increasing chopper control.

Figure 11:
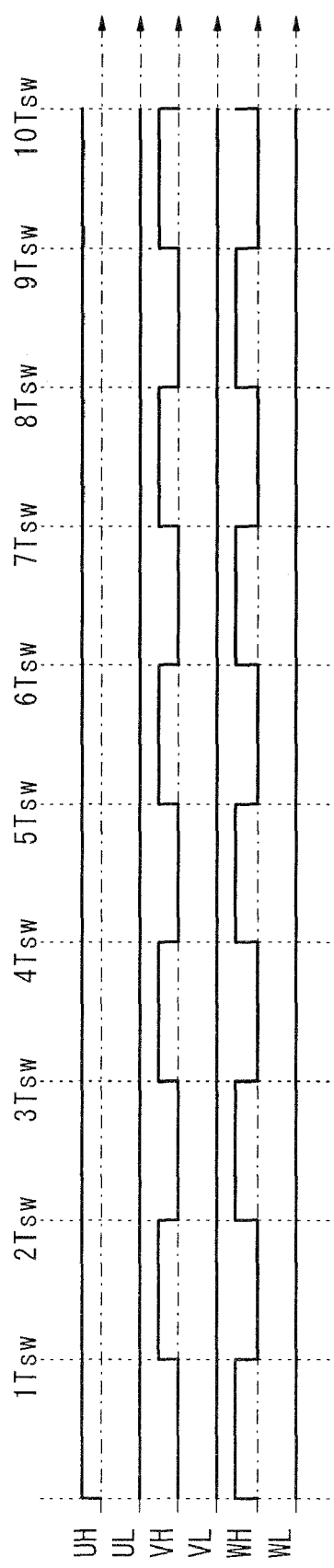
FIG. 11 is a diagram illustrating output waveforms of a drive signal in a first variation.
Figure 12:
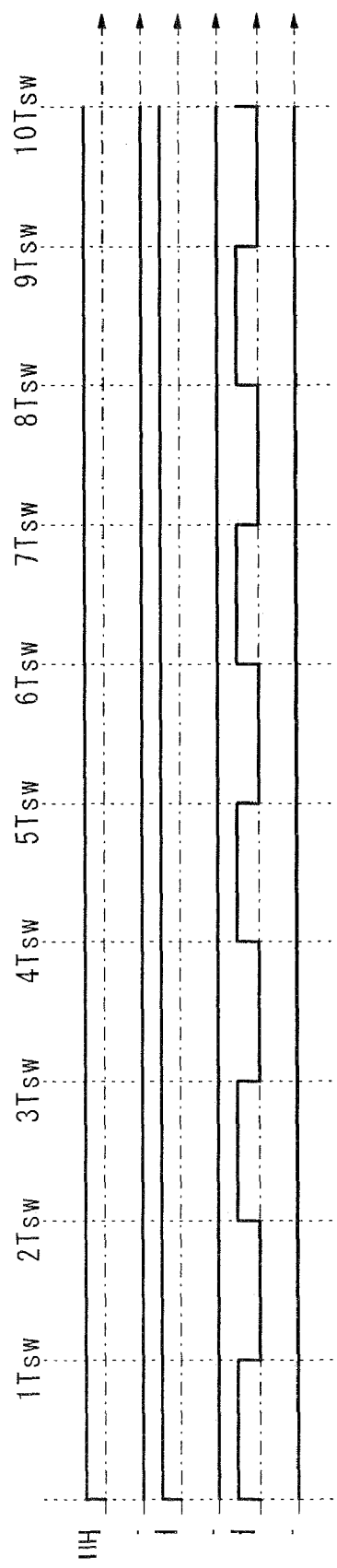
FIG. 12 is a diagram illustrating output waveforms of the drive signal in a second variation.

(4) Switching Process in Direct Couple Control (a) Number of Upper Arm Devices 81u to 81w to be Switched In the embodiment described above, the converter controller 54 outputs the drive signal UH, VH, WH of 100% duty ratio intermittently to each of the upper arm devices 81u to 81w. The intermittent drive signal, however, may be outputted to only one or two of the upper arm devices 81 as shown in FIGS. 11 and 12. In FIG. 11, the drive signal VH, WH of 100% duty ratio is outputted intermittently (alternately) to the V-phase and W-phase upper arm devices 81v, 81w. The upper arm device 81u of the U-phase, however, is continuously supplied with the drive signal UH of 100% duty ratio throughout the direct couple process. In FIG. 12, the drive signal WH of 100% duty ratio is intermittently outputted (every two switching cycles $T_{SW}$) to the upper arm device 81w of the W-phase. The U-phase and V-phase upper arm devices 81u, 81v, however, are continuously provided with the drive signals UH, VH of 100% duty ratio throughout the direct couple process.

(b) Upper Arm Device 81 Not Provided with Drive Signal

Figure 13:
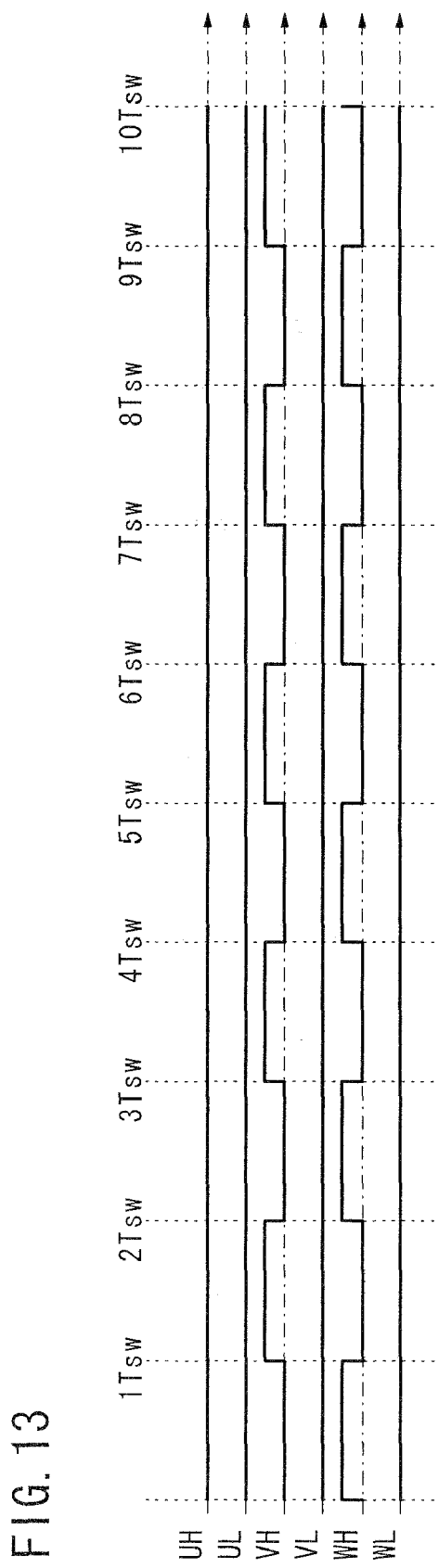
FIG. 13 is a diagram illustrating output waveforms of the drive signal in a third variation.

Although the drive signal UH, VH, WH of 100% duty ratio is outputted, during the direct couple control of the embodiment described above, to all of the U-phase, V-phase, and W-phase upper arm devices 81u-81w, the present invention is not limited thereto. As shown in FIG. 13, for example, the upper arm device 81u may be not provided with the drive signal UH of 100% duty ratio, while the other upper arm devices 81v, 81w are alternately supplied with the drive signals VH, WH of 100% duty ratio. Such control may be employed when the temperature of the upper arm device 81u detected by the temperature sensor 69 (see FIGS. 1 and 2A) is above a predetermined threshold TH [° C.]. In other words, the converter controller 54 may stop the operation of any upper arm device 81 having a temperature higher than the predetermined threshold TH (i.e. the upper arm device 81u in FIG. 13), and operate the upper arm devices 81 having a temperature lower than predetermined threshold TH (i.e. the upper arm devices 81v, 81w in FIG. 13). In this way, the operation of the upper arm device 81 having a temperature above the predetermined threshold TH can be stopped while maintaining the direct couple control. This improves the reliability of the VCU 23.

The drive signal of 100% duty ratio may be selectively outputted to the upper arm device 81 having the lowest temperature of temperatures detected by the temperature sensor 69.

Figure 14:
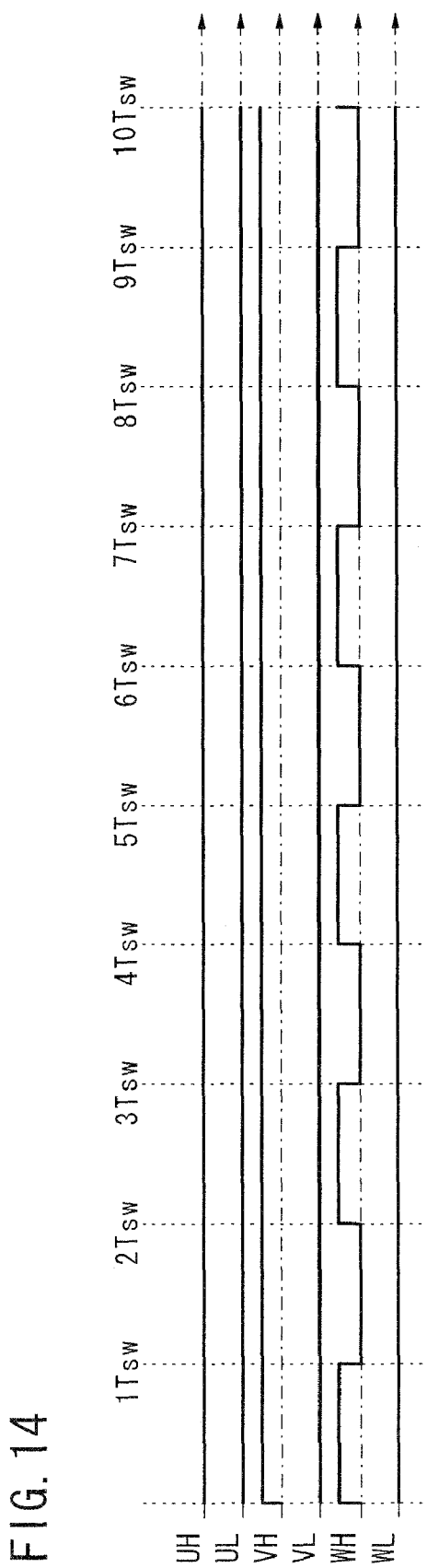
FIG. 14 is a diagram illustrating output waveforms of the drive signal in a fourth variation.

Further, as shown in FIG. 14, the converter controller 54 may output no drive signal UH to the upper arm device 81u, while continuously outputting the drive signal VH of 100% duty ratio to the upper arm device 81v throughout the direct couple process, and the converter controller 54 may output the drive signal WH of 100% duty ratio to the upper arm device 81w every two switching cycle $T_{SW}$.

(c) Length and Intervals of Drive Signals

Figure 15:
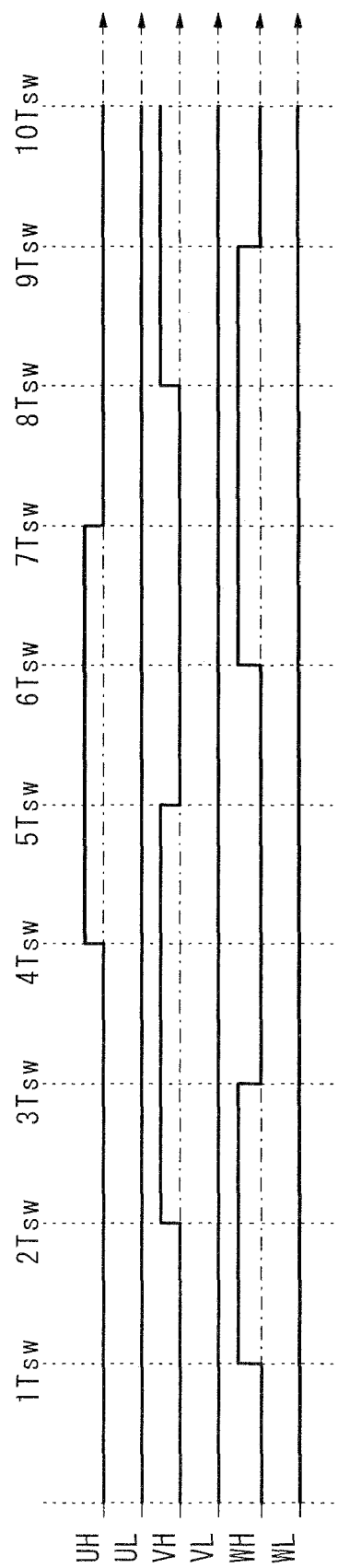
FIG. 15 is a diagram illustrating output waveforms of the drive signal in a fifth variation.

In the embodiment described above, each drive signal UH, VH, WH of 100% duty ratio is generated at a length of one switching cycle $T_{SW}$ and at intervals of three switching cycles $T_{SW}$. However, the present invention is not limited this. As shown in FIG. 15, the length and intervals of the drive signals UH, VH, WH of 100% duty ratio may differ from each other. Further, the drive signal UH, VH, WH for one particular upper arm device 81 may be generated with a length that varies for each output like the drive signal WH shown in FIG. 15.

(d) Order of Outputting Drive Signals

In the direct couple process of the embodiment described above, the drive signals UH, VH, WH of 100% duty ratio are repeatedly outputted in the fixed order of U-phase→V- phase→W-phase→U-phase. However, the order is not limited thereto, and the order of generating the drive signals UH, VH, WH may be changed to, for instance, U-phase→V-phase→W-phase→V-phase→U-phase→W-phase or the like.

(5) Others

In the direct couple process of the embodiment described above, the drive signals UH, VH, WH having a duty ratio of 100% is outputted to the upper arm devices 81*u* to 81*w*. However, the duty ratio of the drive signals UH, VH, WH is not necessarily 100%. The duty ratio may vary as long as the generated drive signals UH, UL, VH, VL, WH, WL do not cause the upper arm devices 81*u* to 81*w* and lower arm devices 82*u* to 82*w* to convert voltage. In a case where current is to be passed from the primary side 1S to the secondary side 2S, if the duty ratios are set to 0% for the drive signals UH, VH, WH and 100% for the drive signals UL, VL, WL, current flows through the diodes 83*u* to 83*w* of the converter 36 without the voltage-decreasing or voltage-increasing chopper process. Further, in a case where current is to be passed from the primary side 1S to the secondary side 2S, if the duty ratios are set such that the lower arm device driving period T2 is less than a minimum ON time of the lower arm devices 82*u* to 82*w* (the minimum driving period required to turn on the lower arm devices 82*u* to 82*w*), also the direct couple through the lower arm devices 82*u* to 82*w* can be achieved without the voltage-increasing chopper process.

Figure 16:
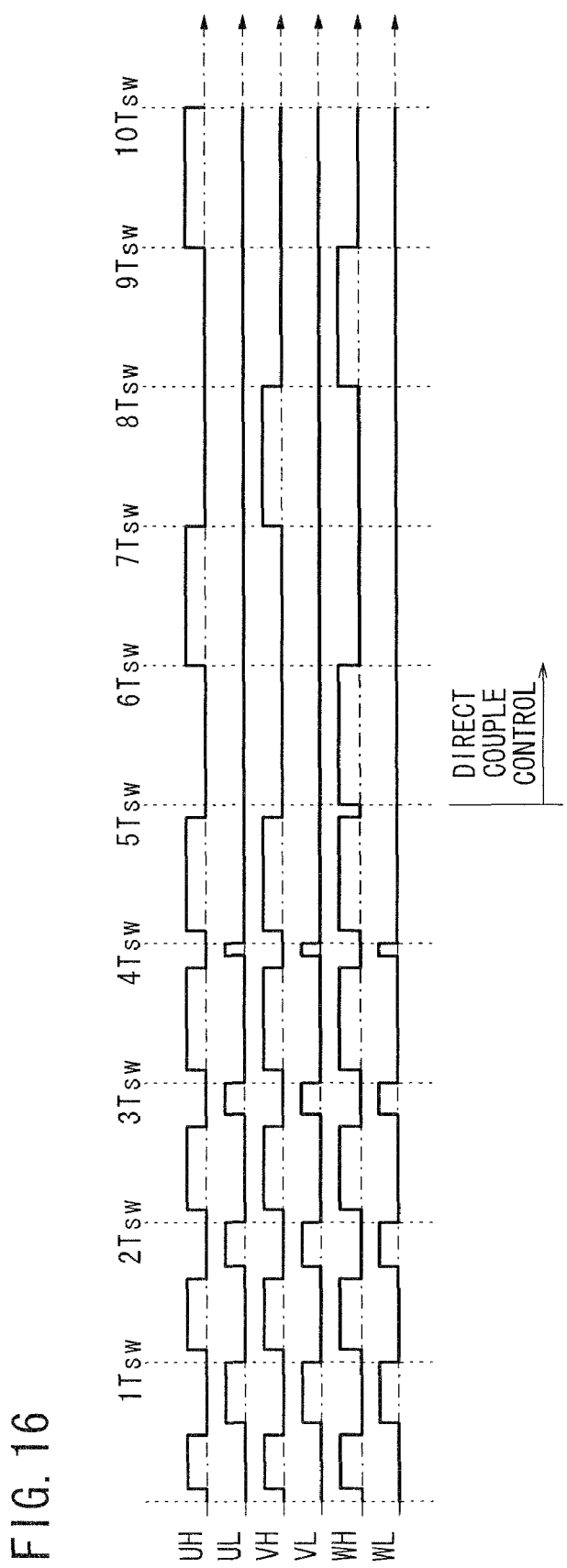
FIG. 16 is a diagram illustrating output waveforms of the drive signal in a sixth variation.

While the embodiment described above performs the rotational switching not only in the direct couple control but also in the voltage-decreasing chopper control and voltage-increasing chopper control, the rotational switching may be applied only to the direct couple control, as shown in FIG. 16.

What is claimed is:

1. A method of controlling a fuel cell vehicle including a DC/DC converter having a plurality of phase arms, the phase arms arranged in parallel in an electrical circuit that forms a branch between a fuel cell and a driving motor and connects to a power storage device, the phase arms each comprising an upper arm switching device and a lower arm switching device, and a controller for outputting drive signals to the upper and lower arm switching devices and controlling voltage conversion of the DC/DC converter, the method comprising the steps of:
   executing, by the controller, direct couple control in which the fuel cell or the driving motor is directly coupled with the power storage device without causing the DC/DC converter to convert voltage; and
   during the direct couple control, intermittently outputting a drive signal that causes no voltage conversion, to at least one of the upper arm switching devices so as to control an on/off state of the upper arm switching devices of the plurality of phase arms such that current flow is shifted from one upper arm switching device of one phase arm to another upper arm switching device of another phase arm whenever a new switching cycle begins.

2. The method of controlling a fuel cell vehicle according to claim 1, further comprising the step of, during the direct couple control, charging the power storage device with electric power generated by the fuel cell.

3. The method of controlling a fuel cell vehicle according to claim 1, further comprising the step of maximizing current generated by the fuel cell, by executing the direct couple control.

4. The method of controlling a fuel cell vehicle according to claim 1, further comprising the step of executing the direct couple control when the fuel cell is in idle-stop mode.

5. The method of controlling a fuel cell vehicle according to claim 4, wherein in the idle-stop mode, gas supply from an air compressor to the fuel cell is stopped.

6. The method of controlling a fuel cell vehicle according to claim 4, wherein in the idle-stop mode, gas supply from a hydrogen tank to the fuel cell is stopped.

7. The method of controlling a fuel cell vehicle according to claim 1, further comprising the step of executing the direct couple control during a regeneration process of the driving motor.

8. The method of controlling a fuel cell vehicle according to claim 1, further comprising the step of executing the direct couple control when the fuel cell drives the driving motor and charges the power storage device.

9. A method of controlling a DC/DC converter apparatus including a DC/DC converter having a plurality of phase arms connected in parallel between a first electric power device and a second electric power device, the phase arms each comprising an upper arm switching device and a lower arm switching device, and a controller for outputting drive signals to the upper and lower arm switching devices and controlling voltage conversion of the DC/DC converter, the method comprising the steps of:
   executing, by the controller, direct couple control in which the first and second electric power devices are directly coupled without causing the DC/DC converter to convert voltage; and
   during the direct couple control, intermittently outputting a drive signal that causes no voltage conversion, to at least one of the upper arm switching devices so as to control an on/off state of the upper arm switching devices of the plurality of phase arms such that current flow is shifted from one upper arm switching device of one phase arm to another upper arm switching device of another phase arm whenever a new switching cycle begins.

10. The method of controlling a DC/DC converter apparatus according to claim 9, further comprising the step of intermittently outputting the drive signal to each of all the switching devices during the direct couple control.

11. The method of controlling a DC/DC converter apparatus according to claim 9, further comprising the step of, during the direct couple control, outputting the drive signal to only one of the switching devices in each switching cycle.

12. The method of controlling a DC/DC converter apparatus according to claim 9, further comprising the step of, during the direct couple control, outputting the drive signals to the upper arm switching devices in a fixed order.

13. The method of controlling a DC/DC converter apparatus according to claim 12, wherein the DC/DC converter is capable of performing voltage-increasing and voltage-decreasing operations, and the controller is capable of executing voltage-increasing control and voltage-decreasing control that cause the DC/DC converter to perform the voltage-increasing operation and the voltage-decreasing operation, respectively,
   the method further comprising the step of outputting, by the controller, the drive signals to the upper arm switching devices in the same order during each of the voltage-increasing control, the voltage-decreasing control, and the direct couple control.

14. The method of controlling a DC/DC converter apparatus according to claim 9, further comprising the step of, during the direct couple control, simultaneously with stopping output of the drive signal to one switching device, starting output of the drive signal to another switching device.

15. The method of controlling a DC/DC converter apparatus according to claims 9, wherein the plurality of switching devices are fixed on a common heat sink.

16. The method of controlling a DC/DC converter apparatus according to claim 9,
wherein the DC/DC converter apparatus further includes temperature sensors for measuring temperatures of the switching devices, and
the method further comprising the step of, by the controller, stopping operation of a switching device having a temperature higher than a predetermined threshold and causing a switching device having a temperature lower than the predetermined threshold to operate.

17. The method of controlling a DC/DC converter apparatus according to claim 9, wherein the first electric power device is a power storage device, the second electric power device is a power generating device, and
the method further comprising the step of, during the direct couple control, charging the power storage device with power generated by the power generating device.

* * * * *